United States Patent
Park et al.

(10) Patent No.: US 11,875,945 B2
(45) Date of Patent: Jan. 16, 2024

(54) CAPACITOR COMPONENT INCLUDING CONNECTION PORTION BETWEEN EXTERNAL ELECTRODE AND BODY

(71) Applicant: SAMSUNG ELECTRO-MECHANICS CO., LTD., Suwon-si (KR)

(72) Inventors: Yong Park, Suwon-si (KR); Ki Pyo Hong, Suwon-si (KR); Jung Tae Park, Suwon-si (KR); Jong Hwa Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 69 days.

(21) Appl. No.: 17/484,631

(22) Filed: Sep. 24, 2021

(65) Prior Publication Data

US 2022/0013287 A1   Jan. 13, 2022

Related U.S. Application Data

(63) Continuation of application No. 16/526,095, filed on Jul. 30, 2019, now Pat. No. 11,302,476.

(30) Foreign Application Priority Data

Dec. 21, 2018   (KR) .......................... 10-2018-0167659

(51) Int. Cl.
*H01G 4/232*   (2006.01)
*H01G 4/30*   (2006.01)
(Continued)

(52) U.S. Cl.
CPC ............ *H01G 4/232* (2013.01); *H01G 4/012* (2013.01); *H01G 4/12* (2013.01); *H01G 4/224* (2013.01);
(Continued)

(58) Field of Classification Search
CPC .......... H01G 4/30; H01G 4/224; H01G 4/232; H01G 4/2325
See application file for complete search history.

(56) References Cited

U.S. PATENT DOCUMENTS

| | | | | |
|---|---|---|---|---|
| 5,053,916 A | * | 10/1991 | Weekamp | ............ H01G 4/2325 361/308.2 |
| 5,866,196 A | * | 2/1999 | Ueno | ..................... H01C 1/142 29/613 |

(Continued)

FOREIGN PATENT DOCUMENTS

| | | | | |
|---|---|---|---|---|
| CN | 108269688 A | | 7/2018 | |
| JP | 06224073 A | * | 8/1994 | ............. H01G 4/232 |

(Continued)

OTHER PUBLICATIONS

Office Action issued in corresponding Chinese Patent Application No. 201910987294.4 dated Jun. 30, 2022, with English translation.
(Continued)

*Primary Examiner* — David M Sinclair
(74) *Attorney, Agent, or Firm* — Morgan, Lewis & Bockius LLP

(57) ABSTRACT

A capacitor component includes a body having a stacked portion in which first internal electrodes and second internal electrodes are alternately stacked with each other and with dielectric layers therebetween in a first direction, and having first and second connection portions disposed on opposite surfaces of the stacked portion, respectively, in a second direction perpendicular to the first direction. First and second external electrodes are disposed on the first and second connection portions, respectively. The first and second connection portions each include a metal layer disposed on the stacked portion and a ceramic layer disposed on the metal layer. Corners of the body have a rounded shape in a
(Continued)

cross-section of the body extending in the first and second directions.

18 Claims, 9 Drawing Sheets

(51) Int. Cl.
    *H01G 4/12* (2006.01)
    *H01G 4/012* (2006.01)
    *H01G 4/224* (2006.01)
    *H01G 4/228* (2006.01)
(52) U.S. Cl.
    CPC ............... *H01G 4/228* (2013.01); *H01G 4/30* (2013.01); *H01G 4/2325* (2013.01)

(56) References Cited

U.S. PATENT DOCUMENTS

| | | | | |
|---|---|---|---|---|
| 6,344,963 | B1* | 2/2002 | Mori | ........................ H01G 4/232 361/306.3 |
| 8,795,454 | B2 | 8/2014 | Matsui et al. | |
| 10,262,800 | B2 | 4/2019 | Mizuno et al. | |
| 10,629,379 | B2 | 4/2020 | Cho et al. | |
| 10,991,512 | B2 | 4/2021 | Park et al. | |
| 11,302,476 | B2* | 4/2022 | Park | ........................ H01G 4/224 |
| 2007/0057237 | A1* | 3/2007 | Ohtani | ........................ C03C 8/18 252/500 |
| 2009/0211687 | A1 | 8/2009 | Iguchi et al. | |
| 2012/0073129 | A1 | 3/2012 | Abe et al. | |
| 2012/0075766 | A1 | 3/2012 | Nishioka et al. | |
| 2012/0229949 | A1 | 9/2012 | Kim | |
| 2012/0234462 | A1 | 9/2012 | Matsui et al. | |
| 2013/0106560 | A1* | 5/2013 | Zenzai | ................... H01F 27/292 361/321.1 |
| 2013/0182368 | A1* | 7/2013 | Jeon | ........................ H01G 4/12 361/301.4 |
| 2013/0208401 | A1* | 8/2013 | Shirakawa | ............. H01G 4/008 216/13 |
| 2014/0029157 | A1 | 1/2014 | Kwag et al. | |
| 2014/0085770 | A1 | 3/2014 | Park et al. | |
| 2015/0021073 | A1 | 1/2015 | Kim | |
| 2015/0021079 | A1 | 1/2015 | Lee et al. | |
| 2016/0027584 | A1 | 1/2016 | Hattori | |
| 2017/0164479 | A1 | 6/2017 | Park et al. | |
| 2017/0243697 | A1 | 8/2017 | Mizuno et al. | |
| 2017/0278635 | A1 | 9/2017 | Mizuno et al. | |
| 2018/0096791 | A1* | 4/2018 | Nishisaka | ................ H01G 4/30 |
| 2018/0114644 | A1* | 4/2018 | Sugita | ........................ H01G 4/12 |
| 2018/0182554 | A1 | 6/2018 | Park et al. | |
| 2018/0190433 | A1 | 7/2018 | Cho et al. | |
| 2019/0355518 | A1 | 11/2019 | Harada | |

FOREIGN PATENT DOCUMENTS

| | | | | |
|---|---|---|---|---|
| JP | 10321460 | A * | 12/1998 | ............. H01G 4/232 |
| JP | 2000277371 | A * | 10/2000 | ............. H01G 4/232 |
| JP | 2004-259736 | A | 9/2004 | |
| JP | 2012-209539 | A | 10/2012 | |
| JP | 2013-098540 | A | 5/2013 | |
| JP | 2014-072522 | A | 4/2014 | |
| JP | 2014096406 | A * | 5/2014 | |
| JP | 2018-060875 | A | 4/2018 | |
| JP | 2018-110212 | A | 7/2018 | |
| KR | 10-2009-0091674 | A | 8/2009 | |
| KR | 10-2012-0103057 | A | 9/2012 | |
| KR | 10-1228752 | B1 | 1/2013 | |
| KR | 10-2015-0011263 | A | 1/2015 | |
| KR | 10-2015-0011268 | A | 1/2015 | |
| KR | 10-2015-0118385 | A | 10/2015 | |
| KR | 10-2017-0113118 | A | 10/2017 | |
| KR | 10-2018-0072974 | A | 7/2018 | |
| KR | 10-2018-0079807 | A | 7/2018 | |

OTHER PUBLICATIONS

Final Office Action issued in corresponding U.S. Appl. No. 16/526,095 dated Sep. 30, 2021.
Office Action issued in corresponding U.S. Appl. No. 16/526,095 dated Jun. 4, 2021.
Office Action issued in corresponding Japanese Patent Application No. 2019-138249 dated Dec. 20, 2022, with English translation.
Office Action issued in corresponding Korean Patent Application No. 10-2018-0167659 dated Jun. 14, 2023, with English translation.

* cited by examiner

CAPACITOR COMPONENT INCLUDING CONNECTION PORTION BETWEEN EXTERNAL ELECTRODE AND BODY

CROSS-REFERENCE TO RELATED APPLICATION(S)

This application is the continuation application of U.S. patent application Ser. No. 16/526,095 filed on Jul. 30, 20219, which claims benefit of priority to Korean Patent Application No. 10-2018-0167659 filed on Dec. 21, 2018 in the Korean Intellectual Property Office, the disclosures of which are incorporated herein by reference in their entirety.

BACKGROUND

1. Field

The present disclosure relates to a capacitor component.

2. Description of Related Art

Among capacitor components, a multilayer ceramic capacitor (MLCC) has advantages such as small size, high capacitance, ease of mounting features, and the like.

With the trend for miniaturization and high capacitance of the multilayer ceramic capacitor (MLCC), it is becoming increasingly important to increase an effective volume ratio of the multilayer ceramic capacitor (ratio of a volume contributing to capacitance to total volume).

Conventionally, when external electrodes are formed, a method of dipping surfaces of the body on which internal electrodes are formed in a paste containing a conductive metal has mainly been used.

However, a thickness of the external electrode formed by the dipping method may not be uniform and external electrodes may be formed to be excessively thin at the corners of the body while the external electrodes may be formed to be unnecessarily thick in other portions. As a result, there is a problem that it may be difficult to secure a high effective volume ratio. Moreover, when a plating layer is formed on the external electrodes in order to increase connectivity and enhance mounting properties of the multilayer ceramic capacitor, reliability of the multilayer ceramic capacitor may be reduced, because a plating liquid may penetrate into the interior of the body.

SUMMARY

An aspect of the present disclosure may provide a capacitor component having improved moistureproof reliability and improved capacitance per unit volume.

According to an aspect of the present disclosure, a capacitor component may include a body including a stacked portion in which first internal electrodes and second internal electrodes are alternately stacked with each other and with dielectric layers therebetween in a first direction, and including first and second connection portions disposed on opposite surfaces of the stacked portion, respectively, in a second direction perpendicular to the first direction. First and second external electrodes are disposed on the first and second connection portions, respectively. The first and second connection portions each include a metal layer disposed on the stacked portion and a ceramic layer disposed on the metal layer. Corners of the body have a rounded shape in a cross-section of the body extending in the first and second directions.

According to another aspect of the present disclosure, a capacitor component may include a body including a stacked portion in which first internal electrodes and second internal electrodes are alternately stacked with each other and with dielectric layers therebetween in a first direction, including first and second connection portions disposed on opposite surfaces of the stacked portion, respectively, in a second direction perpendicular to the first direction, and including first and second margin parts disposed on opposite surfaces of the stacked portion, respectively, in a third direction perpendicular to the first and second directions. First and second external electrodes are disposed on the first and second connection portions, respectively. The first and second connection portions each include a metal layer disposed on the stacked portion and a ceramic layer disposed on the metal layer.

According to a further aspect of the present disclosure, a capacitor component includes a stacked portion including first internal electrodes and second internal electrodes that are alternately stacked and have dielectric layers disposed therebetween. First and second connections portions each include a metal layer disposed on the stacked portion and a ceramic layer disposed on the metal layer, the first and second connections portions being respectively disposed on first and second opposing surfaces of the stacked portion and respectively connected the first internal electrodes and the second internal electrodes. First and second external electrodes are respectively disposed on the first and second connections portions. Corners of the first and second connections portions, and corners of the stacked portion along edges of the first and second opposing surfaces, have a rounded shape.

BRIEF DESCRIPTION OF DRAWINGS

The above and other aspects, features and other advantages of the present disclosure will be more clearly understood from the following detailed description taken in conjunction with the accompanying drawings, in which:

FIG. 5A illustrates a cross-section from which a first internal electrode is observed and FIG. 5B illustrates a cross-section from which a second internal electrode is observed.

DETAILED DESCRIPTION

Figure 1:
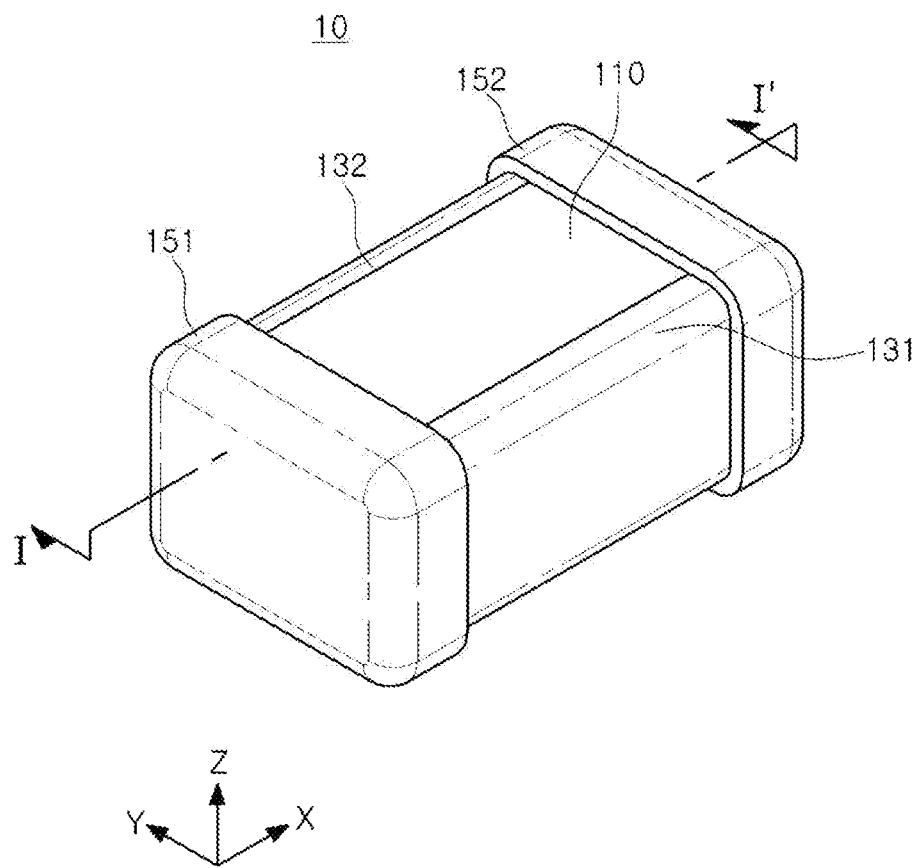
FIG. 1 is a perspective view schematically illustrating a capacitor component according to an exemplary embodiment in the present disclosure.

Hereinafter, exemplary embodiments of the present disclosure will be described in detail with reference to the accompanying drawings.

In the drawings, an X direction refers to a second direction, an L direction, or a length direction, a Y direction refers to a third direction, a W direction, or a width direction, and a Z direction refers to a first direction, a T direction, or a thickness direction.

Capacitor Component

FIG. 1 is a perspective view schematically illustrating a capacitor component according to an exemplary embodiment in the present disclosure.

Figure 2:
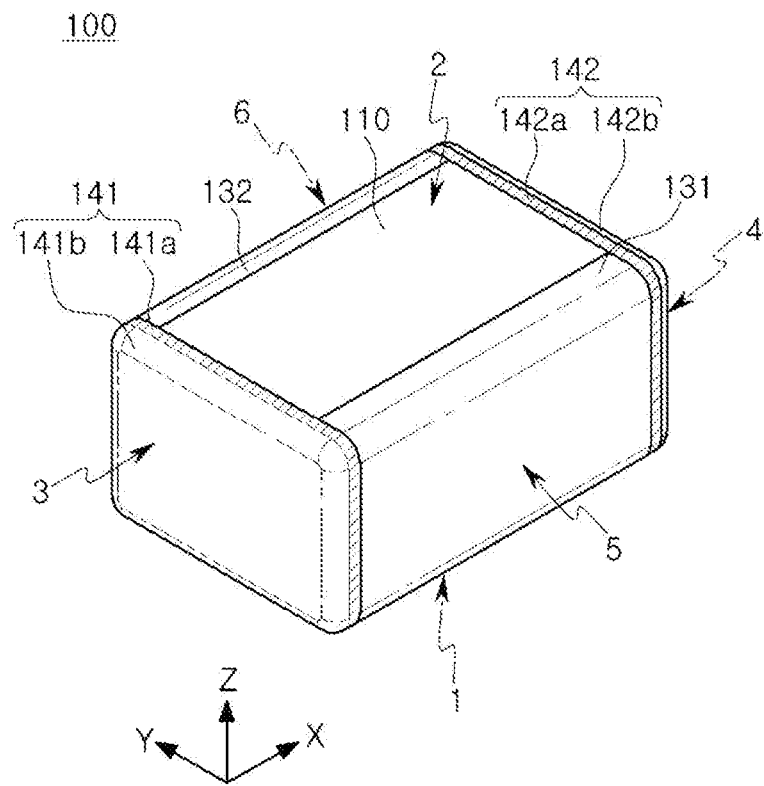
FIG. 2 is a perspective view schematically illustrating a body of the capacitor component of FIG. 1.

FIG. 2 is a perspective view schematically illustrating a body of the capacitor component of FIG. 1.

Figure 3:
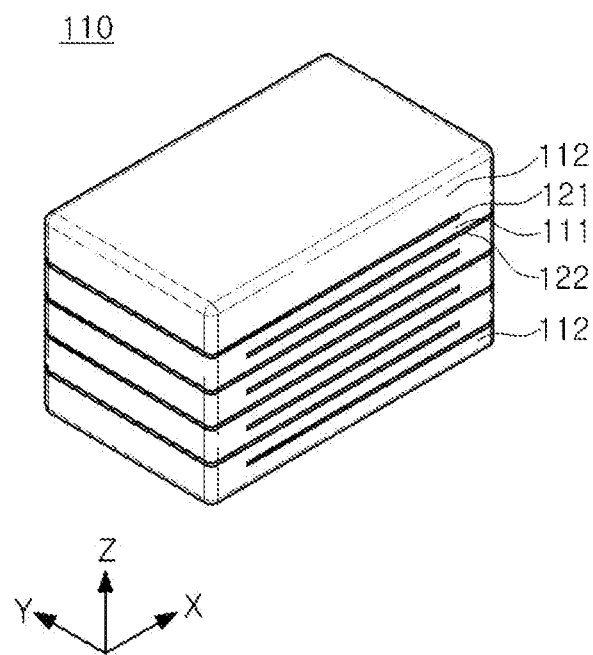
FIG. 3 is a perspective view illustrating a stacked portion of the capacitor component of FIG. 1.

FIG. 3 is a perspective view illustrating a stacked portion of the capacitor component of FIG. 1.

Figure 4:
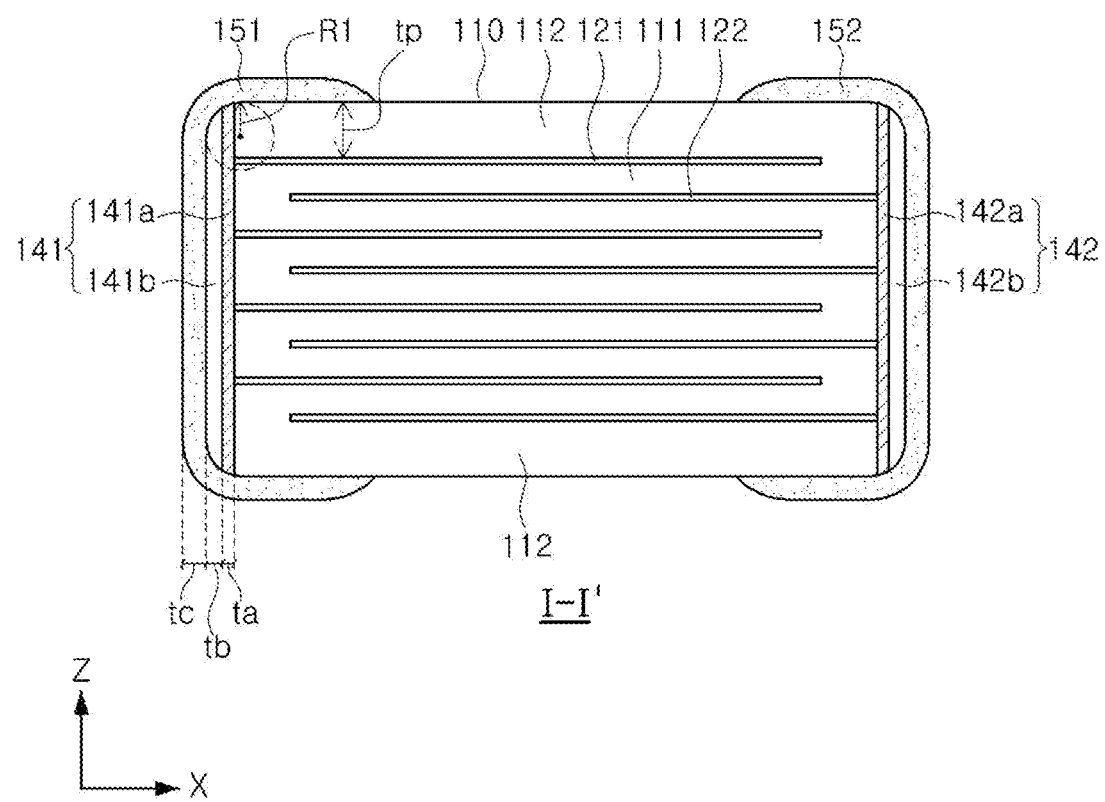
FIG. 4 is a cross-sectional view taken along line I-I' of the capacitor component of FIG. 1.

FIG. 4 is a cross-sectional view taken along line I-I' of the capacitor component of FIG. 1.

Figure 5A:
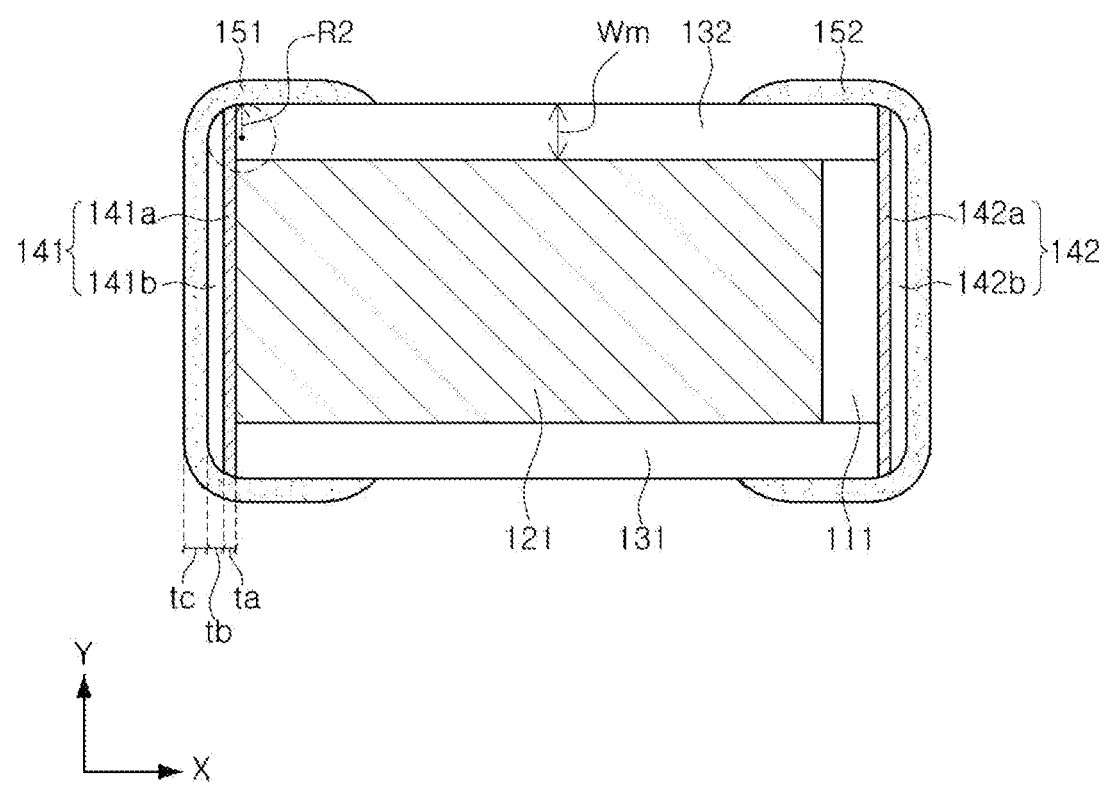
FIGS. 5A and 5B are cross-sectional views taken along planes extending in the X and Y directions of the capacitor component of FIG. 1, where
Figure 5B:
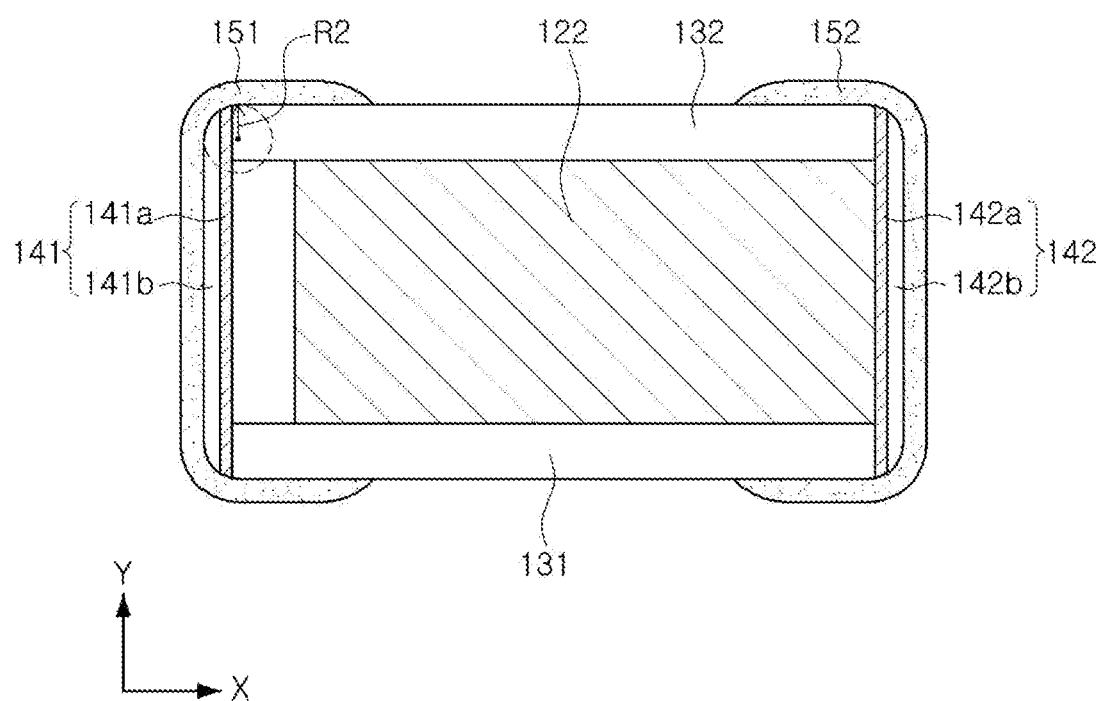

FIGS. 5A and 5B are cross-sectional views taken along planes extending in the X and Y directions of the capacitor component of FIG. 1, where FIG. 5A illustrates a cross-section from which a first internal electrode is observed and FIG. 5B illustrates a cross-section from which a second internal electrode is observed.

Hereinafter, a capacitor component according to an exemplary embodiment in the present disclosure will be described in detail with reference to FIGS. 1 through 4, 5A, and 5B.

A capacitor component 10 according to the present disclosure may include a body 100 including dielectric layers 111, a stacked portion 110 in which first and second internal electrodes 121 and 122 are stacked in a first direction (Z direction), and first and second connection portions 141 and 142 disposed on opposite end surfaces of the stacked portion, respectively, in a second direction (X direction) perpendicular to the first direction. First and second external electrodes 151 and 152 are disposed on the first and second connection portions 141 and 142, respectively. The first and second connection portions 141 and 142 may include metal layers 141a and 142a disposed on the stacked portion 110 and ceramic layers 141b and 142b disposed on the metal layers.

Here, according to an exemplary embodiment in the present disclosure, corners of the body 100 may have a rounded shape on end surfaces of the body in the first and second directions.

In addition, according to another exemplary embodiment in the present disclosure, the body 100 may include first and second margin parts 131 and 132 disposed on opposite surfaces of the stacked portion 110, respectively, in a third direction, perpendicular to the first and second directions.

The body 100 may include the stacked portion 110, and the first and second connection portions 141 and 142.

A specific shape of the body 100 is not particularly limited, but the body 100 may be formed in a hexahedral shape as illustrated or a shape similar thereto. Due to the shrinkage of ceramic powder particles contained in the body 100 during a sintering process, the body 100 may have a substantially hexahedral shape, although it may not be a hexahedral shape with completely straight edges or lines.

The body 100 may have the first and second surfaces 1 and 2 opposing each other in a thickness direction (Z direction) thereof, the third and fourth surfaces 3 and 4 connected to the first and second surfaces 1 and 2 and opposing each other in a length direction (X direction) thereof, and the fifth and sixth surfaces 5 and 6 connected to the first and second surfaces 1 and 2, connected to the third and fourth surfaces 3 and 4, and opposing each other in a width direction (a Y direction) thereof.

In the stacked portion 110, the internal electrodes 121 and 122 may be alternately stacked with dielectric layers 111 disposed therebetween.

A plurality of dielectric layers 111 forming the stacked portion 110 may be in a sintered state, and the dielectric layers 111 adjacent to each other may be integrated with each other so that a boundary therebetween is not readily apparent without using a scanning electron microscope (SEM).

According to an exemplary embodiment in the present disclosure, a raw material of the dielectric layer 111 is not particularly limited as long as it may obtain a sufficient capacitance. For example, a barium titanate-based material, a lead composite perovskite-based material, a strontium titanate-based material, or the like may be used.

The material of the dielectric layer 111 may be prepared by adding various ceramic additives, organic solvents, plasticizers, binders, dispersing agents, and the like, to a powder such as barium titanate ($BaTiO_3$) powder, or the like, according to an object of the present disclosure.

The stacked portion 110 may be formed by alternately stacking a ceramic green sheet in which the first internal electrode 121 is printed on the dielectric layer 111 and a ceramic green sheet in which the second internal electrode 122 is printed on the dielectric layer 111 in a thickness direction (Z direction).

The stacked portion 110 may include a capacitance forming part forming capacitance by including the first and second internal electrodes 121 and 122 disposed to face each other while having the dielectric layers 111 interposed therebetween, and protective parts 112 formed on upper and lower portions of the capacitance forming part.

Upper and lower protective parts 112 may be formed of the same composition as that of the dielectric layer 111 and be formed by stacking one or more dielectric layers that do not include the internal electrode on the uppermost internal electrode of the body 110 and below the lowest internal electrode of the body 110, respectively.

The upper and lower protective parts 112 may basically serve to prevent damage on the internal electrodes due to physical or chemical stress.

A thickness tp of each of the upper and lower protective parts 112 (e.g., measured in the Z direction) is not particularly limited. However, according to an exemplary embodiment in the present disclosure, since sufficient roundedness may be formed at the corners of the body 100 by disposing the connection portions 141 and 142 on the stacked portion 110, the thickness tp of each of the upper and lower protective parts maybe significantly reduced and a capacitance per unit volume of the capacitor component 10 may be improved.

For example, according to an exemplary embodiment in the present disclosure, even when tp is 20 μm or less, the internal electrodes may be protected while forming sufficient roundedness, thereby improving the capacitance per unit volume. Therefore, when tp is 20 μm or less, an effect according to the present disclosure may be more significant.

In addition, a lower limit of tp is not particularly limited and may be appropriately selected in consideration of a radius of curvature R1 of the corner of the body on the end surfaces in the first and second directions of the body, for example, 5 μm or more.

Here, the thickness tp of each of the upper and lower protective parts may refer to a length of each of the upper and lower protective parts 112 in the first direction (Z direction).

On the other hand, the upper and lower protective parts 112 may be divided into a first region adjacent to the capacitance forming part (including the internal electrodes) of the stacked portion 110 and a second region adjacent to an outer surface of the body.

Here, the first region and the second region of the protective parts 112 may have different contents of magnesium (Mg).

Accordingly, an oxide layer may be formed on a void in contact with the capacitance forming part, and an insulating property may be ensured to alleviate an electric field concentration. Therefore, a breakdown voltage (BDV) may be improved (e.g., increased) and an occurrence rate of a short circuit maybe reduced.

In addition, the second region of the protective part 112 maybe adjusted so as to have the content of magnesium (Mg) greater than that of the first region, and compactness of the second region may be increased, thereby improving moistureproof reliability. The first region of the protective region 112 may be adjusted so as to have the content of magnesium (Mg) smaller than that of the second region, thereby increasing adhesion with the capacitance forming part.

The plurality of internal electrodes 121 and 122 may be disposed to face each other while having the dielectric layer 111 interposed therebetween.

The internal electrodes 121 and 122 may include first and second internal electrodes 121 and 122 alternately disposed to face each other while having the dielectric layer 111 interposed therebetween.

The first internal electrode 121 may be exposed to one surface of the stacked portion 110 in the second direction (X direction), and a portion of the first internal electrode 121 exposed to one surface of the stacked portion 110 in the second direction (X direction) may be connected to the metal layer 141a of the first connection portion 141.

The second internal electrode 122 may be exposed to the other/opposing surface of the stacked portion 110 in the second direction (X direction), and a portion of the second internal electrode 122 exposed to the other surface of the stacked portion 110 in the second direction (X direction) may be connected to the metal layer 142a of the second connection portion 142.

The first and second internal electrodes 121 and 122 may be electrically separated from each other by the dielectric layers 111 disposed therebetween.

A material forming each of the first and second internal electrodes 121 and 122 is not particularly limited, but may be a conductive paste including one or more of, for example, a noble metal material such as palladium (Pd), a palladium-silver (Pd—Ag) alloy, or the like, nickel (Ni), and copper (Cu).

A method of printing the conductive paste may be a screen printing method, a gravure printing method, or the like, but is not limited thereto.

The first and second connection portions 141 and 142 may be disposed on opposite surfaces of the stacked portion 110, respectively, opposing each other in the second direction (X direction) perpendicular to the first direction (Z direction).

Conventionally, the external electrodes are formed by dipping the surfaces to which the first and second internal electrodes are respectively exposed in a conductive paste.

A thickness of the external electrode formed by the dipping method was not uniform and the external electrodes were formed too thin at the corner portions of the body while the external electrodes were formed too thick at other portions.

When the external electrodes are formed to have the thin thickness at the corner portions of the body, the external electrodes function as moisture permeation paths and moistureproof reliability may be lowered. Therefore, the external electrodes had to be made thicker in order to secure the external electrodes at the corner portions to a certain thickness or more. Accordingly, there is a problem that mounting density is lowered or plating defects due to glass beading or blister occur.

On the other hand, when the corners of the body are angled, there is a possibility of chipping defect which is a corner breakage phenomenon due to a collision between chips in a process of manufacturing a MLCC, which may cause poor appearance and low moistureproof reliability.

In order to solve the problems described above, an attempt has been made to polish the corner portions of the body so as to have a rounded shape to prevent the external electrodes from being formed to have the thin thickness at the corner portions and to suppress the chipping defect.

However, due to problems such as exposure of the internal electrodes caused by polishing the corner portions of the body, there is a problem in that it is difficult to secure a sufficient round at the corner portions of the body in the conventional structure of the capacitor component. In addition, in a case in which the protective parts are formed to have a thick thickness in order to prevent the exposure of the internal electrode and the like, there is a problem in that the capacitance per unit volume of the capacitor component is lowered.

According to an exemplary embodiment in the present disclosure, since sufficient roundedness is formed at the corners of the body 100 by disposing the first and second connection portions 141 and 142 on the surfaces of the stacked portion 110 opposing each other in the second direction (X direction) thereof, the external electrodes may be prevented from being formed to have the thin thickness at the corner portions and the chipping defect may be suppressed without the capacitance per unit volume being lowered.

Referring to FIG. 4, when a thickness of each of the upper and lower protective parts 112 is tp, and a radius of curvature of the corner of the body 100 measured along a cross-sectional surface extending in the first and second directions (e.g., a cross-sectional surface extending in Z-X directions, such as a cross-sectional surface extending in L-T directions) is R1, R1/tp may be 0.3 or more and 1.4 or less.

When R1/tp is less than 0.3, sufficient roundedness may not be formed, and as a result, the chipping defect may occur or the thickness of the external electrode at the corner portions may be thinned.

On the other hand, when R1/tp exceeds 1.4, a short circuit due to the exposure of the internal electrodes may occur or it may be difficult to form the external electrodes. Here, the short circuit due to the exposure of the internal electrodes refers to a case in which as the corners of the body are polished, the first internal electrode 121 is exposed to a surface on which the second external electrode 152 is formed and is connected to the second external electrode 152, or the second internal electrode 122 is exposed to a surface on which the first external electrode 151 is formed and is connected to the first external electrode 151.

In this case, R1/tp may be greater than 1.0 and 1.4 or less.

In a case in which R1/tp is controlled to exceed 1.0 when the connection portions 141 and 142 do not exist, the short circuit due to the exposure of the internal electrodes is likely to occur. However, even in a case in which R1/tp is controlled to be greater than 1.0 and 1.4 or less when the connection portions 141 and 142 are provided according to the present disclosure, the possibility of occurrence of the short circuit due to the exposure of the internal electrodes may be significantly reduced.

The rounded shapes of the corners of the body 100 on the cross-sectional surfaces in the first and second directions may be formed on the connection portions 141 and 142, and may extend to a portion of the stacked portion 110 as illustrated in FIGS. 3 and 4.

The first and second connection portions 141 and 142 may include metal layers 141a and 142a disposed on the stacked portion 110 and ceramic layers 141b and 142b disposed on the metal layers.

The metal layers 141a and 142a may be disposed on one surface and the other surface of the stacked portion 110 opposing each other in the second direction (X direction), respectively, and may be connected to the first and second internal electrodes 121 and 122, respectively.

The metal layers 141a and 142a may include a metal material having high electrical conductivity, and may include the same metal as the first and/or second internal electrode(s) 121/122 in order to enhance electrical connection with the first and/or second internal electrode(s) 121/122. For example, the metal layers 141a and 142a may include one or more of a noble metal material such as palladium (Pd), a palladium-silver (Pd—Ag) alloy, or the like, nickel (Ni), and copper (Cu).

The metal layers 141a and 142a may be provided in a form of a sintered electrode, and may be sintered simultaneously with the body 100. In this case, the metal layers 141a and 142a before being sintered may be transferred to the body 100 in a state in which it includes metal particles, and an organic material such as a binder, and the organic material, or the like may be removed after the metal layers 141a and 142a are sintered.

A thickness ta of each of the metal layers 141a and 142a is not particularly limited, but may be, for example, 2 to 7 μm. Here, the thickness ta of each metal layer may refer to a length of the metal layer in the second direction (X direction).

The ceramic layers 141b and 142b may be disposed on the metal layers 141a and 142a, respectively, and may serve to improve sealing characteristics to significantly reduce permeation of water, plating solution, and the like from the outside. The ceramic layers 141b and 142b may be formed so as not to cover end surfaces of the metal layers 141a and 142a in the first direction (Z direction) and the third direction (Y direction).

The ceramic layers 141b and 142b may be formed of a ceramic material such as barium titanate or the like. In this case, the ceramic layers 141b and 142b may include the same ceramic material as that included in the dielectric layers 111, or may be formed of the same material as the dielectric layers 111.

The ceramic layers 141b and 142b may be formed by the transferring method similarly to the metal layers 141a and 142a, and may be then subjected to a sintering process. Before being sintered, the ceramic layers 141b and 142b may need to have high adhesion for the purpose of a transferring process. To this end, before being sintered, the ceramic layers 141b and 142b may include a relatively large amount of an organic material such as a binder, or the like. In this case, since some of the organic material may remain even after the ceramic layers 141b and 142b are sintered, the ceramic layers 141b and 142b may include a larger amount of organic material component than that of the dielectric layer 111.

A thickness tb of each of the ceramic layers is not particularly limited, but may be, for example, 3 to 15 μm.

Here, the thickness tb of the ceramic layer may refer to a length of the ceramic layer in the second direction (X direction).

The first and second connection portions 141 and 142 may be formed using a method of transferring sheets and may therefore have a uniform thickness. Accordingly, a ratio of the minimum value to the maximum value of the thickness of each of the first and second connection portions 141 and 142 may be 0.9 to 1.0. Here, the thickness of each of the first and second connection portions 141 and 142 may refer to a length of each of the first and second connection portions 141 and 142 in the second direction (X direction).

FIGS. 6 through 9 are views illustrating processes of forming a capacitor component, including a connection portion 141, according to exemplary embodiments in the present disclosure using a transferring method.

Figure 6:
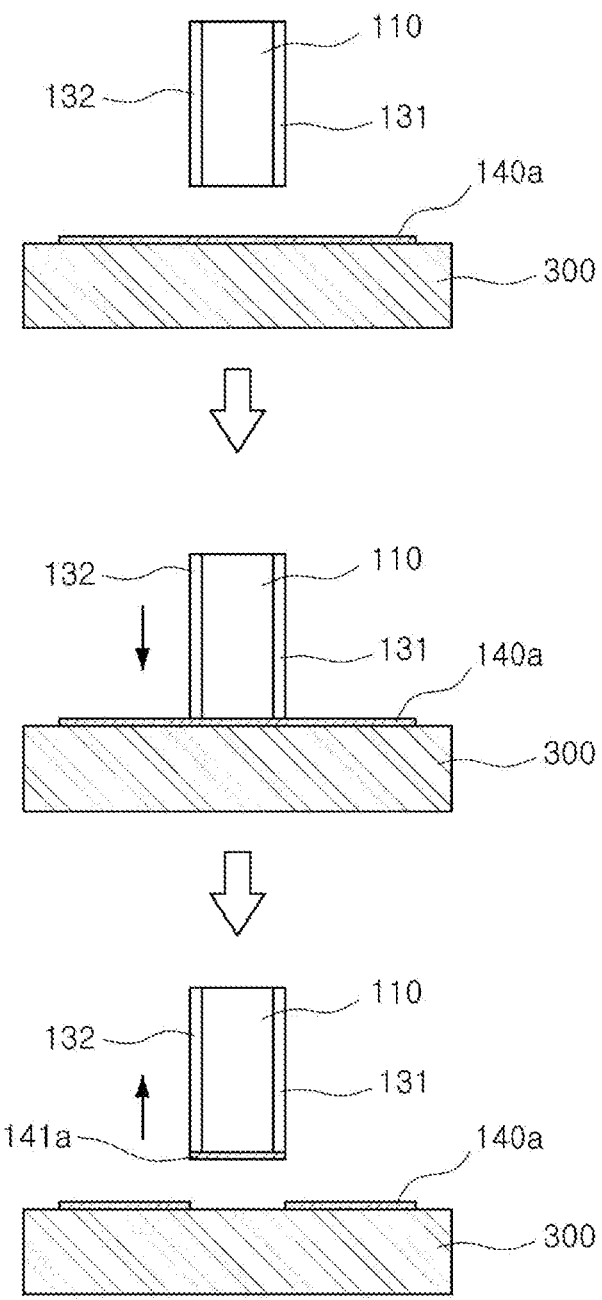
FIGS. 6 through 9 are views illustrating processes of forming a capacitor component according to an exemplary embodiment in the present disclosure using a transferring method.

As illustrated in FIG. 6, in a process of transferring the metal layer 141a, after a metal layer sheet 140a is prepared on a support 300, the stacked portion 110 may be applied and compressed to the metal layer sheet 140a to allow the metal layer 141a to be attached to a surface of the stacked portion 110. The metal layer sheet 140a maybe in a state before being sintered, and may include components such as a binder, an organic solvent, and the like.

Figure 7:
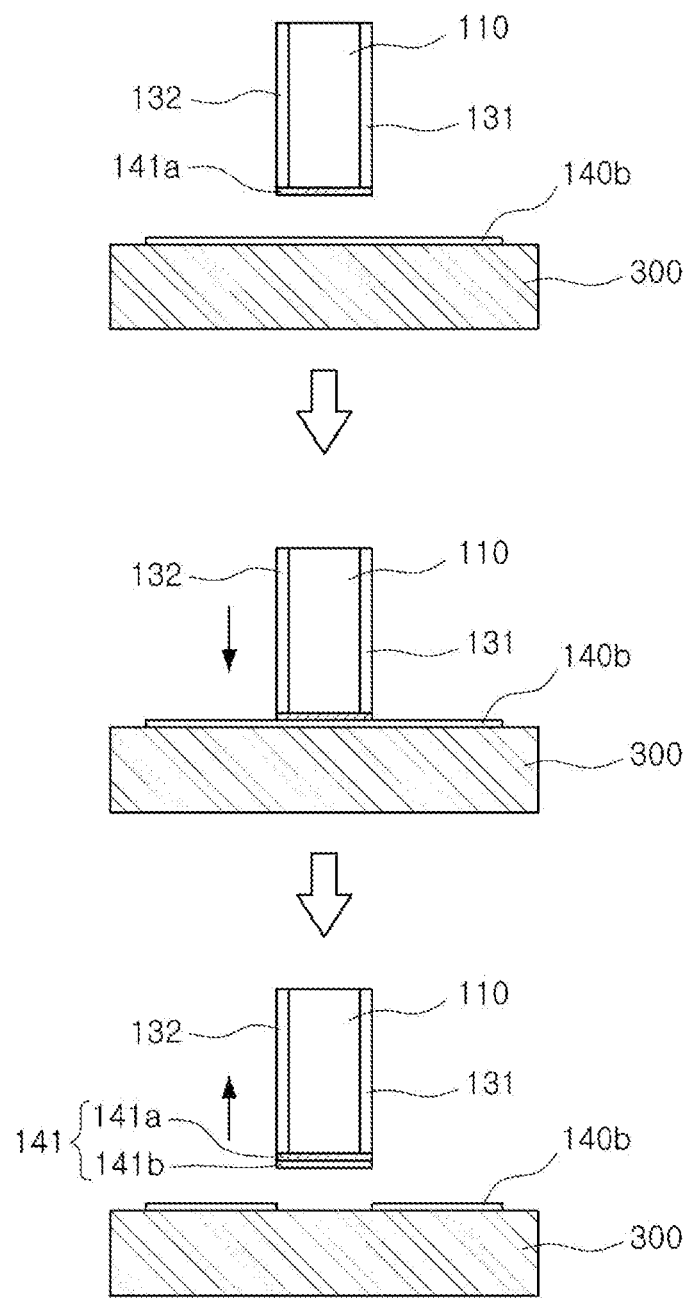

Thereafter, as illustrated in FIG. 7, after a ceramic layer sheet 140b is prepared on the support 300, the stacked portion 110 (e.g., having the metal layer 141a attached thereto) may be compressed to the ceramic layer sheet 140b to allow the ceramic layer 141b to be attached to a surface of the metal layer 141a. The ceramic layer sheet 140b may be in a state before being sintered, and may include components such as a binder, an organic solvent, and the like.

Figure 8:
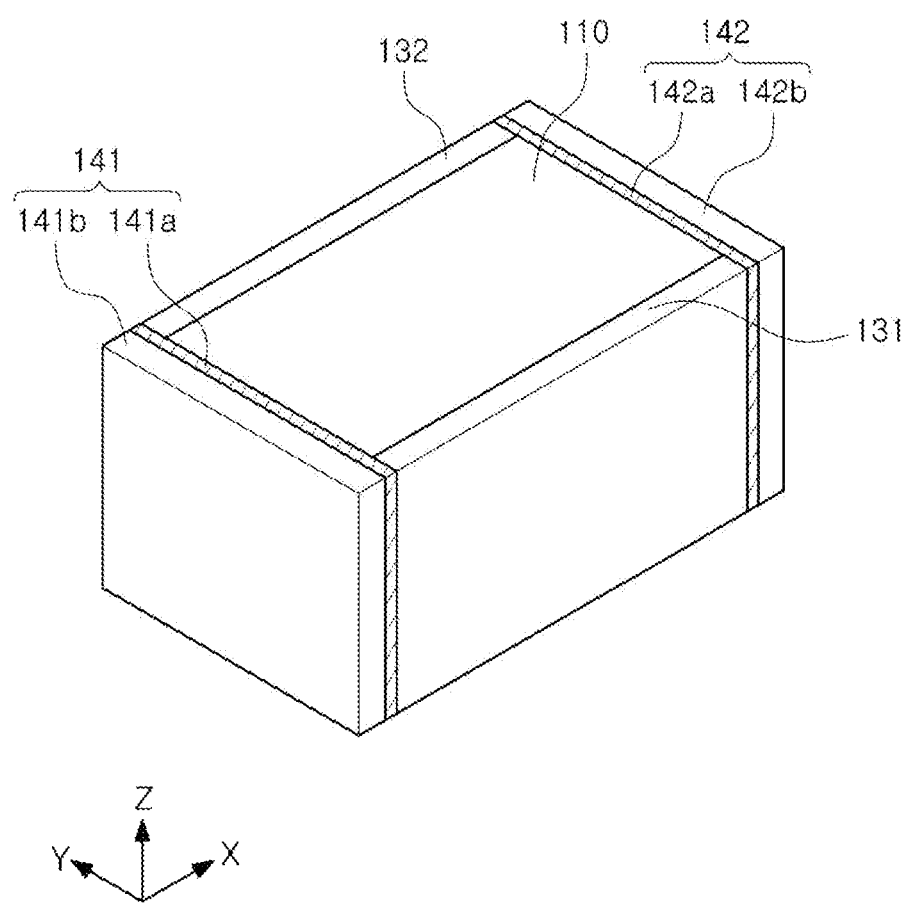

Thereafter, the metal layer 142a and the ceramic layer 142b may be formed by repeating the same process on a surface opposing the surface on which the metal layer 141a and the ceramic layer 141b are formed, thereby preparing the body 100 illustrated in FIG. 8.

Thereafter, the capacitor component 10 may be completed by polishing the corners of the body in a rounded shape through the polishing process and dipping the polished body 100 into the conductive paste to form the external electrodes 151 and 152.

Figure 9:
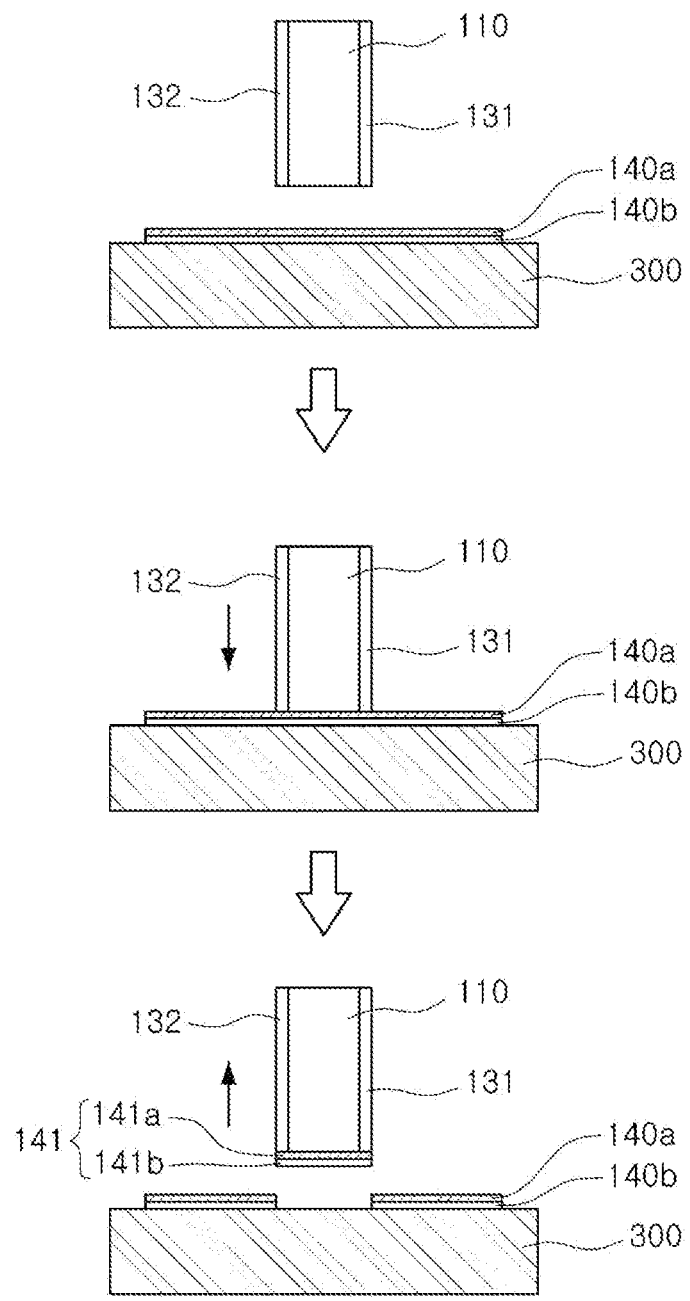

On the other hand, the first connection portion 141 may also be formed by a single transferring process by preparing the ceramic layer sheet 140b and the metal layer sheet 140a on the support 300 in a stacked state, as illustrated in FIG. 9, without separately transferring the metal layer and the ceramic layer.

The first and second margin parts 131 and 132 may be disposed on opposite surfaces of the stacked portion 110, respectively, in the third direction (Y direction) perpendicular to the first and second directions.

When the internal electrodes are exposed to the outside of the body, a short circuit may occur due to an introduction of conductive foreign substances or the like, thereby decreasing reliability of a multilayer ceramic capacitor. Therefore, conventionally, when the internal electrodes are formed in the dielectric layer, an area of the dielectric layer is formed to be greater than the area of the internal electrodes, and a margin region is formed in the remaining peripheral portion of the internal electrodes excluding the portions connected to the external electrodes. When the internal electrodes are formed in the dielectric layer in the manufacturing process, the internal electrodes have a shape that protrudes from the margin regions. Such a protruding shape may cause a step, and when several tens to several hundreds of dielectric layers are stacked, the dielectric layers are stretched to fill the step. When the dielectric layers are stretched, the internal electrodes may also be bent. When the internal electrodes are bent, a breakdown voltage (BDV) may be reduced at the corresponding bent portions.

Therefore, the capacitor component according to an exemplary embodiment in the present disclosure may prevent the occurrence of the step due to the internal electrodes by removing the margin regions from the opposite surfaces of the stacked portion 110 in the third direction. Accordingly, reliability of the capacitor component may be improved by preventing the internal electrodes from being bent in the third direction (Y direction) and preventing the breakdown voltage from being reduced.

Since the first internal electrode 121 and the second internal electrode 122 are both exposed on the opposite surfaces of the stacked portion 110 in the third direction, the first and second margin parts 131 and 132 are separately disposed to protect the internal electrodes formed in the stacked portion 110.

Further, conventionally, there is a need to sufficiently secure a thickness of the margin region in consideration of manufacturing errors such as misalignment of the internal electrodes. However, in the stacked portion 110 according to an exemplary embodiment in the present disclosure, since the first and second internal electrodes 121 and 122 are both exposed to the opposite surfaces of the stacked portion in the third direction through a cutting process or the like, it is not necessary to consider the manufacturing errors such as misalignment of the internal electrodes. Therefore, since the width (Wm) of each of the first and second margin parts 131 and 132 may be set to be smaller than the width of the conventional margin region, capacitance per unit volume of the capacitor component may be improved.

Therefore, when the body 100 includes the first and second margin parts 131 and 132, the first internal electrode 121 may be exposed to the opposite surfaces of the stacked portion 110 in the third direction (e.g., surfaces 5 and 6) and one surface (e.g., surface 3) of the stacked portion 110 in the second direction, and a portion of the first internal electrode 121 exposed to one surface of the stacked portion 110 in the second direction may be connected to the first connection portion 141. In addition, the second internal electrode 122 may be exposed to the opposite surfaces of the stacked portion 110 in the third direction (e.g., surfaces 5 and 6) and the other surface (e.g., surface 4) of the stacked portion 110 in the second direction, and a portion of the second internal electrode 122 exposed to the other surface of the stacked portion 110 in the second direction may be connected to the second connection portion 142.

The first and second margin parts 131 and 132 maybe formed of an insulating material, and may be formed of a ceramic material such as barium titanate. In this case, the first and second margin parts 131 and 132 may include the same ceramic material as that included in the dielectric layer 111 or may be formed of the same material as the dielectric layer 111.

A method of forming the first and second margin parts 131 and 132 is not particularly limited, but the first and second margin parts 131 and 132 may be formed, for example, by applying a slurry including ceramic, or stacking dielectric sheets on the opposite surfaces of the stacked portion in the third direction.

In addition, the first and second margin parts 131 and 132 may also be formed by transferring the dielectric sheets using the transferring method described above. Accordingly, the first and second margin parts 131 and 132 may have a uniform thickness. When a thickness of each of the first and second margin parts 131 and 132 is Wm, a ratio of the minimum value to the maximum value of Wm may be 0.9 to 1.0.

In a case in which the first and second margin parts 131 and 132 are formed using the method of transferring the dielectric sheets, it is preferable that the first and second margin parts 131 and 132 before being sintered have high adhesion for a transferring process. To this end, the first and second margin parts 131 and 132 may include a relatively large amount of an organic material such as a binder. In this case, since some of the organic material may remain even after the first and second margin parts 131 and 132 are sintered, the first and second margin parts 131 and 132 may include a larger amount of the organic material component than is contained in the dielectric layer(s) 111.

It is not necessary to particularly limit the thickness Wm of each of the first and second margin parts 131 and 132. However, according to the present disclosure, since sufficient roundedness maybe formed at the corners of the body by disposing the connection portions 141 and 142 on the stacked portion 110, Wm may be significantly reduced and the capacitance per unit volume of the capacitor component may be improved.

For example, according to the present disclosure, even in a case in which Wm is 15 µm or less, since sufficient roundedness may be formed and the internal electrodes 121 and 122 may also be protected, the capacitance per unit volume may be improved.

In addition, a lower limit of Wm is not particularly limited and may be appropriately selected in consideration of a radius of curvature R2 of the corner of the body on the cross-sectional surface in the second and third directions of the body (e.g., a cross-sectional surface in X-Y direction, across-sectional surface in L-W directions), for example, 5 µm or more.

Here, the thickness (Wm) of each of the first and second margin parts refers to a length of each of the first and second margin parts 131 and 132 in the third direction (Y direction).

Referring to FIGS. 5A and 5B, when a thickness of each of the first and second margin parts 131 and 132 is Wm, and a radius of curvature of the corner of the body on a cross-sectional surface in the second and third directions (e.g., a cross-sectional surface in X-Y directions, a cross-sectional surface in L-W directions) is R2, R2/Wm may be 0.3 or more and 1.4 or less.

When R2/Wm is less than 0.3, sufficient roundedness may not be formed, and as a result, the chipping defect may occur or the thickness of the external electrode at the corner portions may be thinned.

On the other hand, when R2/Wm exceeds 1.4, a short circuit due to the exposure of the internal electrodes may occur or it may be difficult to form the external electrodes. Here, the short circuit due to the exposure of the internal electrodes refers to a case in which as the corners of the body are polished, the first internal electrode 121 is exposed to a surface on which the second external electrode 152 is formed and is thereby connected to the second external electrode 152, or the second internal electrode 122 is exposed to a surface on which the first external electrode 151 is formed and is thereby connected to the first external electrode 151.

In this case, R2/Wm may advantageously be set to be greater than 1.0 and 1.4 or less.

In a case in which R2/Wm is controlled to exceed 1.0 when the connection portions 141 and 142 do not exist, the short circuit due to the exposure of the internal electrodes is likely to occur. However, even in a case in which R2/Wm is controlled to be greater than 1.0 and 1.4 or less when the connection portions 141 and 142 are provided according to the present disclosure, the possibility of the occurrence of short circuits due to the exposure of the internal electrodes may be significantly reduced.

On the other hand, to facilitate the polishing process, the radius of curvature R2 of the corner of the body on the cross-sectional surface in the second and third directions may be the same as the radius of curvature R1 of the corner the body on the cross-sectional surface in the first and second directions, but is not particularly limited. The corners of the body may also be polished so that R2 and R1 are different from each other.

In addition, the first and second margin parts 131 and 132 may be divided into a first region adjacent to (e.g., and facing) the stacked portion 110 and a second region adjacent to (e.g., and facing) an outer surface of the body 100.

Here, the first region and the second region of the margin parts 131 and 132 may have different contents of magnesium (Mg).

Accordingly, an oxide layer may be formed on surfaces of the margin parts 131 and 132 in contact with the stacked portion 110, and an insulating property may be ensured to alleviate an electric field concentration. Therefore, a breakdown voltage (BDV) may be improved and an occurrence rate of a short circuit may be reduced.

In addition, the second region of the margin parts 131 and 132 may be adjusted so as to have the content of magnesium (Mg) greater than that of the first region, and compactness of the second region may be increased, thereby improving moistureproof reliability. The first region of the margin parts 131 and 132 may be adjusted so as to have the content of magnesium (Mg) smaller than that of the second region, thereby increasing adhesion with the stacked portion 110.

As the first and second connection portions 141 and 142 are formed using the transferring method after the first and second margin parts 131 and 132 are formed on the stacked portion 110, the first connection portion 141 maybe disposed to cover one surface of each of the first and second margin parts 131 and 132 in the second direction (X direction), and the second connection portion 142 may be disposed to cover another surface of each of the first and second margin parts 131 and 132 opposing the one surface in the second direction (X direction).

In addition, the first connection portion 141 may be disposed within a range that does not deviate from one surface of the stacked portion 110 and each of the first and second margin parts 131 and 132 in the second direction (X direction) (e.g., the first connection portion may be disposed on only one surface of each of the stacked portion and the first and second margin parts, and may not extend onto any other surface of the stacked portion and the first and second margin parts), and the second connection portion 142 may be disposed within a range that does not deviate from the other surface of the stacked portion 110 and each of the first and second margin parts 131 and 132 in the second direction (X direction) (e.g., the second connection portion may be disposed on only one surface of each of the stacked portion and the first and second margin parts, and may not extend onto any other surface of the stacked portion and the first and second margin parts). That is, the first connection portion 141 may not extend to the opposite surfaces of the stacked portion 110 in the first direction (Z direction), and may not extend to the opposite surfaces of the first and second margin parts 131 and 132 in the third direction (Y direction).

The first and second external electrodes 151 and 152 may be disposed on the first and second connection portions 141 and 142, respectively.

The first external electrode 151 may be electrically connected to the first internal electrode (s) 121 through the metal layer 141a of the first connection portion 141, and the second external electrode 152 may be electrically connected to the second internal electrode (s) 122 through the metal layer 142a of the second connection portion 142.

The first and second external electrodes 151 and 152 maybe disposed to be extended to the opposite surfaces of the first and second connection portions 141 and 142 in the first direction (Z direction), and the metal layers 141a and 142a of the first and second connection portions may be exposed in the first direction (Z direction) of the first and second connection portions so as to be connected to the first and second external electrodes 151 and 152, respectively. In this case, the first and second external electrodes 151 and 152 may also be disposed to be extended to the opposite surfaces of the first and second connection portions 141 and 142 in the third direction (Y direction), and the metal layers 141a and 142a of the first and second connection portions may also be exposed in the third direction (Y direction) of the first and second connection portions so as to be connected to the first and second external electrodes 151 and 152, respectively.

In addition, the first and second external electrodes 151 and 152 may be disposed to be extended to portions of the first and second surfaces 1 and 2 of the body. In this case, the first and second external electrodes 151 and 152 may also be disposed to be extended to portions of the fifth and sixth surfaces 5 and 6 of the body.

A method of forming the first and second external electrodes 151 and 152 is not particularly limited, and the first and second external electrodes 151 and 152 may be formed, for example, by dipping the body in a paste including conductive metals and glass.

In this case, the conductive metal may include one or more selected from the group consisting of copper (Cu), silver (Ag), nickel (Ni), and an alloy thereof.

According to an exemplary embodiment in the present disclosure, since the corners of the body 100 have the rounded shape, a phenomenon in which the thickness of the external electrodes 151 and 152 is thinned at the corners of the body 100 may be suppressed even in the case in which the external electrodes are formed using the dipping process.

Therefore, when a thickness of each of the first and second external electrodes 151 and 152 is tc, a ratio of the minimum value to the maximum value of tc may be 0.8 to 1.0.

Meanwhile, in order to improve mountability with the board, a plating layer may be formed on the first and second external electrodes 151 and 152.

More specifically, the plating layer may be a nickel (Ni) plating layer and/or a tin (Sn) plating layer. The Ni plating layer and the Sn plating layer may be sequentially formed on the electrode electrodes. The plating layer may also include a plurality of Ni plating layers and/or a plurality of Sn plating layers.

A size of the capacitor component 10 is not particularly limited, but as the size of the capacitor component is smaller, the capacitance per unit volume according to the present disclosure may be significantly improved.

In particular, in the case of the capacitor component of 0603 size having a length of 0.6 mm or less and a width 0.3 mm or less, the capacitance per unit volume may be significantly improved. Here, the length of the capacitor component may refer to a length of the capacitor component in the second direction (X direction), and the width of the capacitor component may refer to a length of the capacitor component in the third direction (Y direction).

As set forth above, according to the exemplary embodiment in the present disclosure, the capacitance per unit volume may be improved and the moistureproof reliability may be improved by disposing the connection portions on the stacked portion.

In addition, sufficient roundedness may be formed at the corners of the body, and when the round is formed at the corners of the body, the thickness of each of the external electrodes may be uniformly formed and the external electrodes may be formed to have a thin thickness.

In addition, when the margin parts are disposed on the opposite side surfaces of the stacked portion, the capacitance per unit volume may be further improved.

Various advantages and effects of the present disclosure are not limited to the description above, and may be more readily understood in the description of exemplary embodiments in the present disclosure.

While exemplary embodiments have been shown and described above, it will be apparent to those skilled in the art that modifications and variations could be made without departing from the scope of the present invention as defined by the appended claims.

What is claimed is:

1. A capacitor component comprising:
   a body including a stacked portion in which first internal electrodes and second internal electrodes are alternately stacked with each other and with dielectric layers therebetween in a first direction, including first and second connection portions disposed on opposite surfaces of the stacked portion, respectively, in a second direction perpendicular to the first direction, and including first and second margin parts disposed on opposite surfaces of the stacked portion, respectively, in a third direction perpendicular to the first and second directions; and
   first and second external electrodes disposed on the first and second connection portions, respectively,
   wherein the first and second connection portions each include a metal layer disposed on the stacked portion,
   wherein a thickness of each of the first and second external electrodes is tc, a ratio of the minimum value to the maximum value of tc may be 0.8 to 1.0,
   wherein at least one of the metal layers of the first or second connection portion includes a same metal as the first internal electrodes,
   wherein the at least one of the metal layers includes one or more of palladium (Pd), a palladium-silver (Pd—Ag) alloy, nickel (Ni), or copper (Cu), and
   wherein at least one of the first or second external electrode has an average thickness greater than that of a corresponding one of the metal layers of the first or second connection portion, respectively and the first and second connection portions do not contact the first and second external electrodes in the second direction.

2. The capacitor component of claim 1, wherein the first and second external electrodes are disposed to extend to opposite surfaces of the first and second connection portions in the first direction, and
   the metal layer of each of the first and second connection portions is exposed in the first and third directions to a respective one of the first and second external electrodes and is connected to the respective one of the first and second external electrodes.

3. The capacitor component of claim 1, wherein the body includes first and second surfaces opposing each other in the first direction, third and fourth surfaces opposing each other in the second direction, and fifth and sixth surfaces opposing each other in the third direction, and
   the first and second external electrodes are disposed to each extend to portions of the first and second surfaces of the body.

4. The capacitor component of claim 1, wherein a length of the capacitor component is 0.6 mm or less, and a width of the capacitor component is 0.3 mm or less.

5. The capacitor component of claim 1, wherein the first connection portion is disposed to cover one surface of each of the first and second margin parts, and
   the second connection portion is disposed to cover another surface of each of the first and second margin parts opposite to the one surface in the second direction.

6. The capacitor component of claim 1, wherein the first connection portion is disposed on only one surface of each of the stacked portion and the first and second margin parts, from among all surfaces of the stacked portion and the first and second margin parts, and
   the second connection portion is disposed on only another surface of each of the stacked portion and the first and second margin parts, from among all surfaces of the stacked portion and the first and second margin parts.

7. The capacitor component of claim 1, wherein the first internal electrode is exposed to the opposite surfaces of the stacked portion in the third direction and to one surface of the stacked portion in the second direction, and
   the second internal electrode is exposed to the opposite surfaces of the stacked portion in the third direction and another surface of the stacked portion opposite to the one surface in the second direction.

8. The capacitor component of claim 1, wherein a thickness of each of the first and second margin parts is 15 μm or less.

9. The capacitor component of claim 1, wherein when a thickness of each of the first and second margin parts is Wm, a ratio of the minimum value to the maximum value of Wm is 0.9 to 1.0.

10. A capacitor component comprising:
    a body including a stacked portion in which first internal electrodes and second internal electrodes are alternately stacked with each other and with dielectric layers therebetween in a first direction, including first and second connection portions disposed on opposite surfaces of the stacked portion, respectively, in a second direction perpendicular to the first direction, and including first and second margin parts disposed on opposite surfaces of the stacked portion, respectively, in a third direction perpendicular to the first and second directions; and
    first and second external electrodes disposed on the first and second connection portions, respectively,
    wherein the first and second connection portions each include a metal layer disposed on the stacked portion,
    wherein the thickness of each of the first and second external electrodes is tc, a ratio of the minimum value to the maximum value of tc may be 0.8 to 1.0,
    wherein at least one of the metal layers of the first or second connection portion includes a same metal as the first internal electrode and the at least one of the metal layers of the first or second connection portion includes one or more of palladium (Pd), a palladium-silver (Pd—Ag) alloy, nickel (Ni), or copper (Cu), and wherein at least one of the first or second external electrode includes a conductive metal and glass, and wherein the body has a rounded shape in a cross-section of the body extending in the first and second directions, and corners of the body include at least a portion of the stacked portion.

11. The capacitor component of claim 10, wherein the first and second external electrodes are disposed to extend to opposite surfaces of the first and second connection portions in the first direction, and the metal layer of each of the first and second connection portions is exposed in the first and third directions to a respective one of the first and second external electrodes and is connected to the respective one of the first and second external electrodes.

12. The capacitor component of claim 10, wherein the body includes first and second surfaces opposing each other in the first direction, third and fourth surfaces opposing each other in the second direction, and fifth and sixth surfaces opposing each other in the third direction, and the first and second external electrodes are disposed to each extend to portions of the first and second surfaces of the body.

13. The capacitor component of claim 10, wherein a length of the capacitor component is 0.6 mm or less, and a width of the capacitor component is 0.3 mm or less.

14. The capacitor component of claim 10, wherein the first connection portion is disposed to cover one surface of each of the first and second margin parts, and the second connection portion is disposed to cover another surface of each of the first and second margin parts opposite to the one surface in the second direction.

15. The capacitor component of claim 10, wherein the first connection portion is disposed on only one surface of each of the stacked portion and the first and second margin parts, from among all surfaces of the stacked portion and the first and second margin parts, and the second connection portion is disposed on only another surface of each of the stacked portion and the first and second margin parts, from among all surfaces of the stacked portion and the first and second margin parts.

16. The capacitor component of claim 10, wherein the first internal electrode is exposed to the opposite surfaces of the stacked portion in the third direction and to one surface of the stacked portion in the second direction, and the second internal electrode is exposed to the opposite surfaces of the stacked portion in the third direction and another surface of the stacked portion opposite to the one surface in the second direction.

17. The capacitor component of claim 10, wherein a thickness of each of the first and second margin parts is 15 μm or less.

18. The capacitor component of claim 10, wherein when a thickness of each of the first and second margin parts is Wm, a ratio of the minimum value to the maximum value of Wm is 0.9 to 1.0.

* * * * *